United States Patent
Shimomura et al.

(10) Patent No.: US 7,035,036 B2
(45) Date of Patent: Apr. 25, 2006

(54) METHOD AND APPARATUS FOR WRITING SERVO DATA WITH PERPENDICULAR MAGNETIC RECORDING IN A DISK DRIVE

(75) Inventors: Kazuhito Shimomura, Akishima (JP); Koji Osafune, Ome (JP); Koji Yano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/926,393

(22) Filed: Aug. 26, 2004

(65) Prior Publication Data

US 2005/0073771 A1    Apr. 7, 2005

(30) Foreign Application Priority Data

Aug. 29, 2003  (JP)  ............... 2003-306992

(51) Int. Cl.
  *G11B 21/02*   (2006.01)
  *G11B 5/02*    (2006.01)
(52) U.S. Cl. .......................... 360/75; 360/57
(58) Field of Classification Search ...... None
  See application file for complete search history.

(56) References Cited

U.S. PATENT DOCUMENTS

| | | | |
|---|---|---|---|
| 5,757,574 A | 5/1998 | Chainer et al. | |
| 5,828,513 A | 10/1998 | Greenberg | |
| 5,867,337 A | 2/1999 | Shimomura | |
| 6,023,389 A | 2/2000 | Cunningham | |
| 2001/0043418 A1* | 11/2001 | Nishida et al. | ............... 360/55 |
| 2003/0021056 A1 | 1/2003 | Shimomura | |

OTHER PUBLICATIONS

Muraoka et al. "200 KFRPI Data Recording Using a Novel Bi-Latered Head in Perpendicular Magneti Recording", IEEE Transactions on Magnetics, vol. 29, No. 6, Nov. 1993.*

Danish Search Report dated Jun. 30, 2005 for Singapore Appln. No. 200404525-8.

* cited by examiner

*Primary Examiner*—Andrew L. Sniezek
(74) *Attorney, Agent, or Firm*—Pillsbury Winthrop Shaw Pittman, LLP (57) ABSTRACT

There is disclosed a servo writing method in which servo data is recorded by a perpendicular magnetic recording system. In the servo writing method, at the time of perpendicular magnetic recording of the servo data on a disk, a servo writing operation is executed including an offset process set based on the hard-easy transition shift (HETS) phenomenon.

6 Claims, 7 Drawing Sheets

METHOD AND APPARATUS FOR WRITING SERVO DATA WITH PERPENDICULAR MAGNETIC RECORDING IN A DISK DRIVE

CROSS-REFERENCE TO RELATED APPLICATIONS

This application is based upon and claims the benefit of priority from prior Japanese Patent Application No. 2003-306992, filed Aug. 29, 2003, the entire contents of which are incorporated herein by reference.

BACKGROUND OF THE INVENTION

1. Field of the Invention

The present invention relates generally to a field of a disk drive of a perpendicular magnetic recording system, particularly to a servo writing method in which servo data is recorded on a disk medium by perpendicular magnetic recording.

2. Description of the Related Art

In recent years, practical use of a disk drive of a perpendicular magnetic recording system has been pushed forward. In the perpendicular magnetic recording system, a disk drive using a write head called a single pole type head (SPT) suitable for perpendicular magnetic recording, and a disk medium (hereinafter referred to simply as a disk) which is a double-layered perpendicular recording medium is promising.

In general, servo data for use in a control for positioning heads is recorded on disks before shipping the disk drives. In a servo writing step for recording the servo data, a servo write-only device called a servo track writer (STW) is used.

The servo data is roughly classified into an address code and a servo burst signal. The address code includes a cylinder code and a sector code.

Since the servo data is used for correctly positioning the head at a target position on the disk, a high-precision writing method is required. In the disk drive, the servo data recorded on the disk is read by a read head at the time of positioning the head. At this time, precision in positioning the head depends on precision in reproducing the servo data.

For example, when the servo burst signal included in the servo data is recorded, and when erase bands exist on opposite sides, the signal-to-noise (S/N) ratio in an operation for reproducing the servo data sometimes drops because of losses by the erase bands. To solve this problem, a technique has been proposed in which the track width of the servo burst signal is expanded to improve the S/N ratio (see U.S. Pat. No. 6,023,389, for example).

In the disk drive of the perpendicular magnetic recording system, the servo data is recorded on the disk by the write head using an SPT suitable for the perpendicular magnetic recording.

Additionally, in the perpendicular magnetic recording system, a phenomenon has been confirmed in which a recorded magnetized state changes, when a recording magnetic field having a polarity opposite to a magnetization polarity magnetically recorded on the disk beforehand is applied by the write head using the SPT. This phenomenon is called a hard-easy transition shift (hereinafter sometimes abbreviated as HETS) or simply a hard transition.

In HETS, the recording magnetic field from the head apparently becomes strong, and the magnetization displacement point shifts, when the magnetization having a pole opposite to that of the magnetization before the recording on the disk is written.

It has been confirmed that when an influence of HETS phenomenon is exerted at the time of a servo writing operation and, for example, when the servo data is written in a radial direction from an inner periphery to an outer periphery on the disk, the servo data shifts in a reverse direction, and is recorded. When the servo data is recorded in this manner, a reproduction error of the cylinder code is generated, or the precision in reproducing the servo burst signal deteriorates. As a result, the precision in positioning the head deteriorates.

BRIEF SUMMARY OF THE INVENTION

In accordance with one embodiment of the present invention, there is provided a servo writing method including facilities to compensate for a shift of servo data in a radial direction by the HETS phenomenon in a servo writing step by a perpendicular magnetic recording system.

The servo writing method is a method in which servo data is recorded on a disk medium by use of a write head of a perpendicular magnetic recording system. The write head is moved to a designated position of the disk medium in a radial direction. When the servo data is recorded at the designated position by the use of the write head, a write operation is executed including an offset process set based on the hard-easy transition shift (HETS) phenomenon.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present embodiment will be described hereinafter with reference to the drawings.

A servo writing method of the present embodiment will be described with reference to FIGS. 1, 2, 3, and 15.

Figure 3:
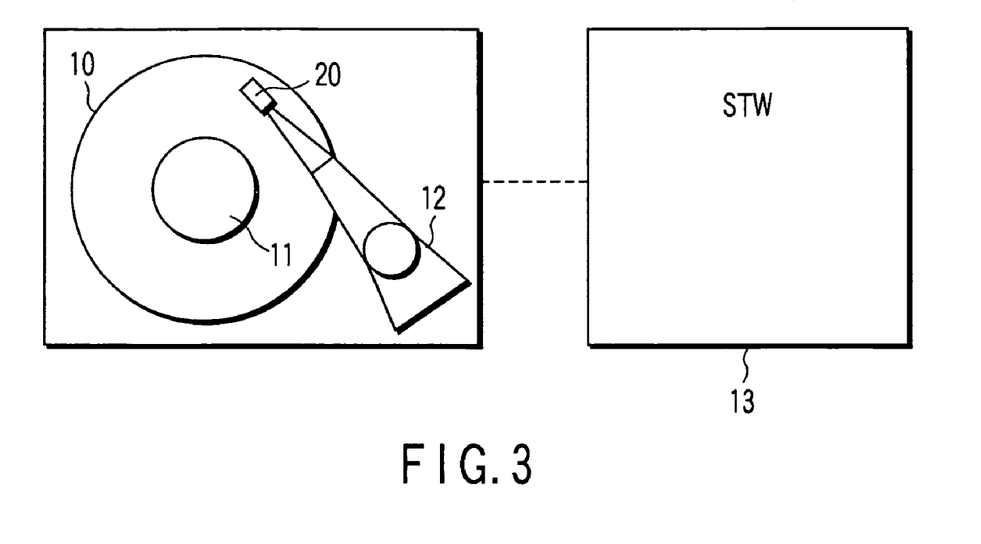
FIG. 3 is a diagram showing a servo track writer according to the present embodiment.

In the servo writing method of the present embodiment, as shown in FIG. 3, servo data is recorded with respect to a disk 10 incorporated in an assembled disk drive using a write head 20 mounted on an actuator 12 of the drive under control of an STW 13. The disk 10 is rotated by a spindle motor 11. An SPT suitable for perpendicular magnetic recording is used in the write head 20.

Moreover, the servo writing method of the present embodiment may be a method in which a multi stack (MS)-STW for recording the servo data collectively with respect to a plurality of disks by one servo writing operation is used. Even in this method, the servo writing operation is performed by the write head using the SPT suitable for the perpendicular magnetic recording.

Figure 4:
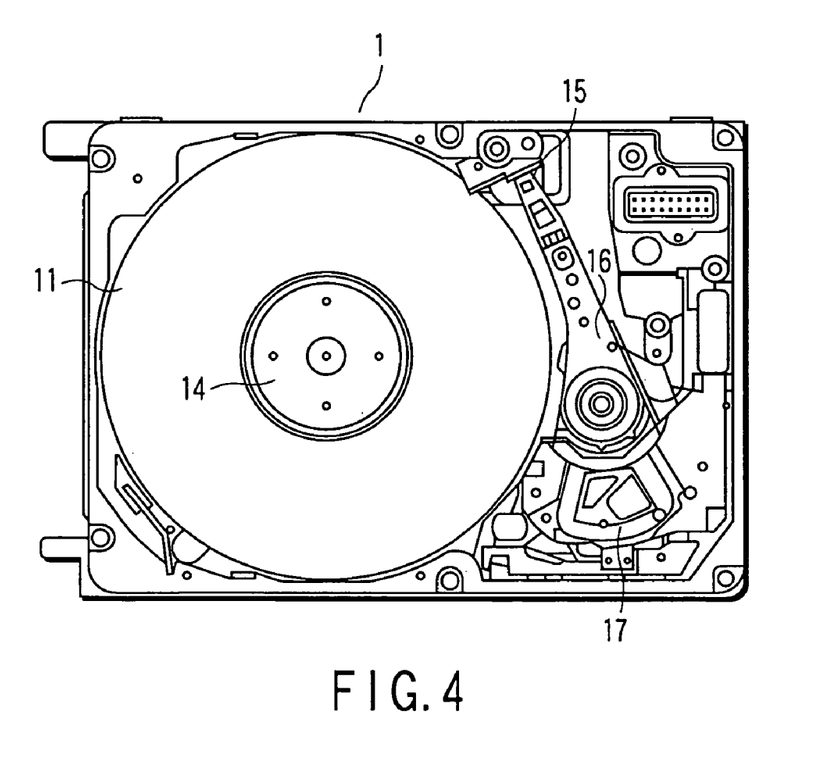
FIG. 4 is a diagram showing a main part of a disk drive of a perpendicular magnetic recording system according to the present embodiment.

Furthermore, as shown in FIG. 4, a self servo writing system may also be used in which the servo data is recorded using a head 15 of the drive without using any STW in a disk drive 1 assembled as a product. The head 15 includes a write head using an SPT, and a read head usually using a giant magnetoresistive (GMR) element. The head 15 is mounted on an actuator 16 driven by a voice coil motor (VCM) 17.

(Perpendicular Magnetic Recording and HETS Phenomenon)

Perpendicular magnetic recording and the HETS phenomenon will be described as an assumption for describing a servo writing method of the present embodiment.

Figure 5:
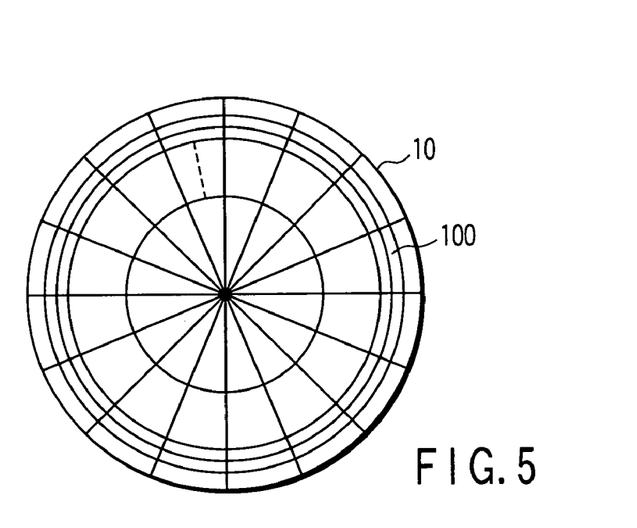
FIG. 5 is a diagram showing a format of a disk according to the present embodiment.

As shown in FIG. 5, a large number of tracks 100 are constituted in a disk 10 incorporated in a disk drive 1. Each track includes a servo area in which servo data is recorded by the servo writing method of the present embodiment, and a data area in which user data is recorded.

Figure 6:
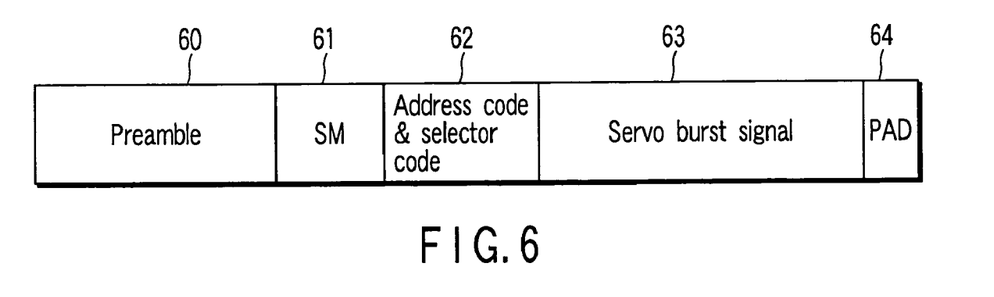
FIG. 6 is a diagram showing a format of servo data according to the present embodiment.

As shown in FIG. 6, the servo data includes a preamble 60, a servo mark (SM) 61, an address code 62, servo burst signals (bursts A to D) 63, and a pad (PAD) portion 64. The address code 62 is gray code data including a cylinder code and a sector code.

Figure 9:
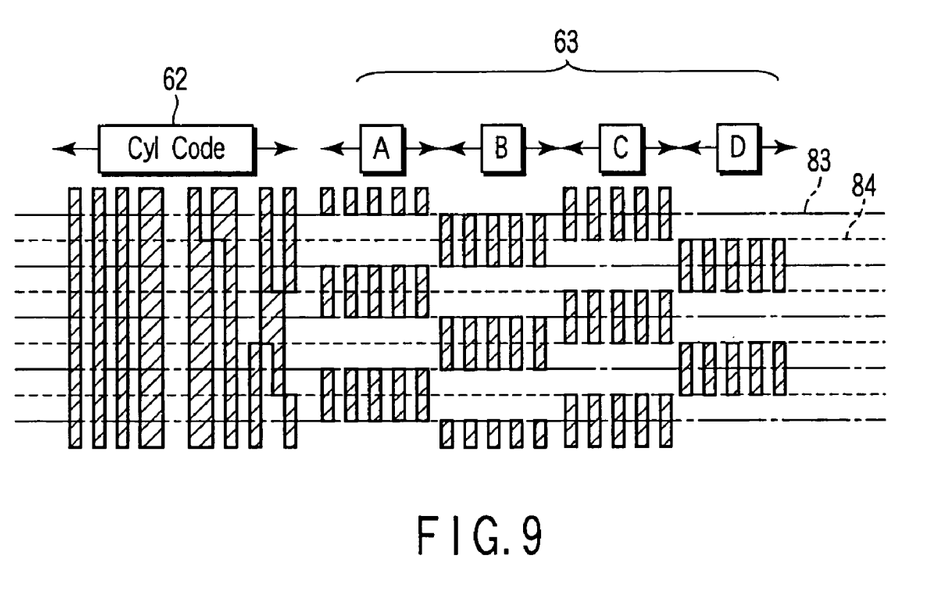
FIG. 9 is a diagram showing an ideal recorded state of the servo data according to the present embodiment.

FIG. 9 shows a state of ideal servo data (62, 63) recorded on the disk 10. In the disk drive 1, a track (cylinder) for positioning the head 15 is identified using the cylinder code red by the head 15. A control for positioning the head is executed in such a manner that an amplitude value at the time of reproduction of the burst A is equal to that at the time of reproduction of the burst B. Accordingly, the head 15 is positioned on a track center line 83. It is to be noted that in FIG. 9, reference numeral 84 denotes a track boundary line.

Figure 7:
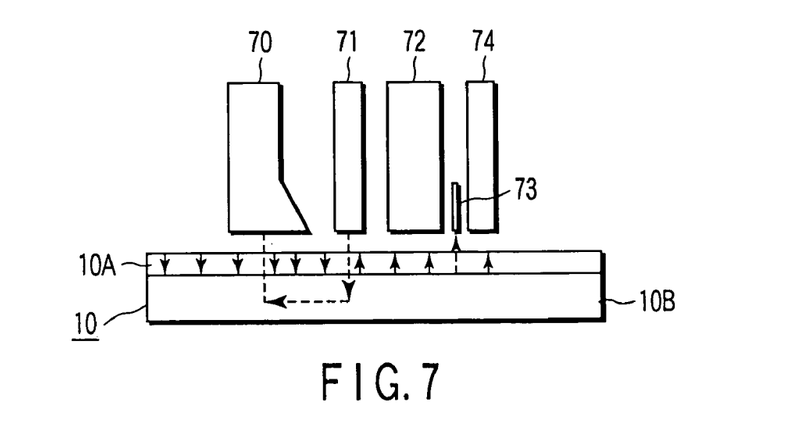
FIG. 7 is a diagram showing a structure of a head of the perpendicular magnetic recording system according to the present embodiment.

In the head (15, 20) in which the SPT suitable for the perpendicular magnetic recording is used, as shown in FIG. 7, a magnetic field generated from a main magnetic pole 71 of the write head is applied to a perpendicular magnetic recording layer 10A of a double-layered disk 10, passes through a soft magnetic layer 10B, and is converged into a return yoke 70. That is, a magnetic field loop is formed in the SPT. Here, in the write head, a magnetic domain inside the SPT is reversed by a recording current, and accordingly a direction of generation of the magnetic field changes.

Moreover, the head includes a read head including a GMR element 73 held between reproduction shielding members 72, 74. The GMR element 73 reproduces a recording magnetic field generated from the magnetic recording layer 10A on the disk 10. The reproduction shielding members 72, 74 remove interference magnetic noise at the time of the reproduction.

Figure 8:
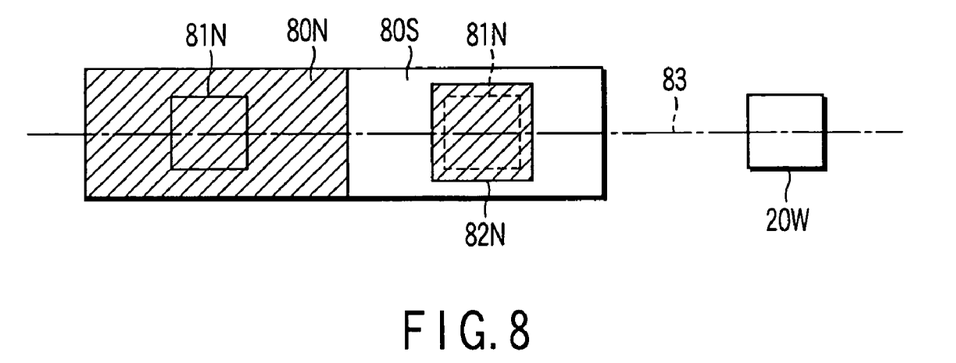
FIG. 8 is a diagram showing an HETS phenomenon according to the present embodiment.

In the perpendicular magnetic recording system, as shown in FIG. 8, a recording magnetic field having a polarity opposite to a magnetization polarity (80S) magnetically recorded on the disk beforehand is applied by a write head 20W which is an SPT in the perpendicular magnetic recording system, and then a recorded magnetized state changes. This phenomenon is the HETS phenomenon.

Concretely, when the recording magnetic field having the same polarity as that of magnetization (80N) on the disk before the recording is applied, magnetization (81N) corresponding to the shape of the head 20W is recorded. On the other hand, when the magnetization (81N) opposite to the magnetization (80S) before the recording is written, the recording magnetic field from the head apparently becomes strong, a magnetization displacement point shifts, and a shape of recorded magnetization (82N) becomes larger than that of the head.

Figure 10:
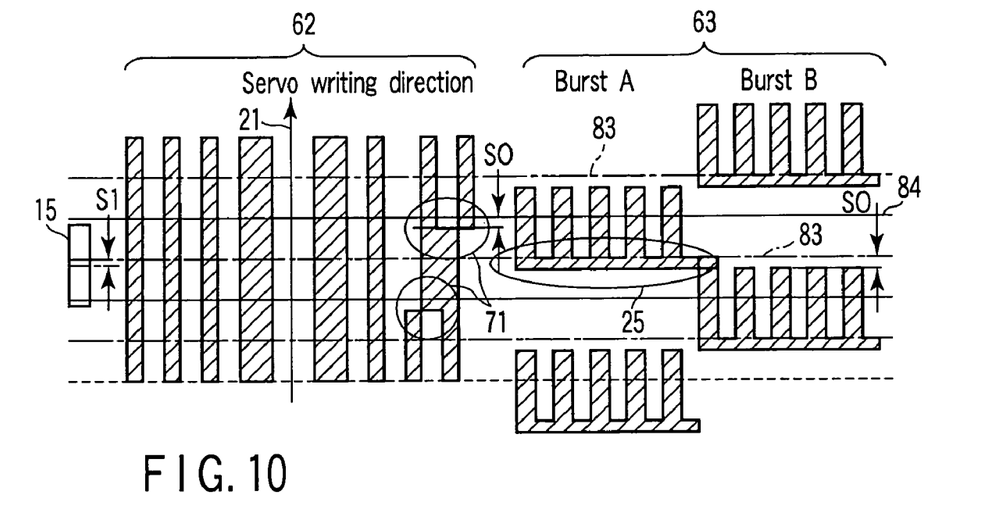
FIGS. 10 and 11 are diagrams showing an actual recorded state of the servo data according to the present embodiment.

By this HETS phenomenon, a servo pattern (servo data) actually recorded on the disk indicates a recorded state shown in FIG. 10 with respect to an ideal recorded state shown in FIG. 9.

That is, the address code 62 shifts from the track boundary 84 in a direction (width direction) reverse to a servo writing direction 21 by an amount S0, and is recorded in a portion (71) different from a track adjacent to bits. The burst data 63 is brought into such a recorded state that the bits of the burst A or the burst B are connected to each other in a width S0 corresponding to the shift amount in the vicinity of the center line 83 of the track (see reference numeral 25). When the read head 15 is positioned in such a manner that amplitude values of the bursts A and B are equal (positional error is 0) in this recorded state of the servo data, the head shifts from the center line 83 of the track (target position) by S1 (S0/2).

On the other hand, the cylinder code shifts by the shift amount S0 and is recorded. Therefore, when the read head 15 is positioned in order to eliminate the positional error (burst A−burst B=0), the head reads a part (corresponding to the shift amount S1) of the adjacent cylinder code servo-written later. Additionally, the amount of the data read from the adjacent track depends on a reproduction track width of the read head 15.

Usually, cylinder addresses on the disk 10 are allocated in such a manner that the address decreases on an outer peripheral side (e.g., cylinder 0), and increases toward the inner periphery. Therefore, when the servo writing direction extends toward the outer periphery from the inner periphery, the cylinder code shifts on an inner peripheral side, and is recorded. Therefore, a read head 11R reads a part of the cylinder code of the adjacent track on a "−1" side with respect to the cylinder code of the track in which the head is positioned. Conversely, when the servo writing direction extends toward the inner periphery from the outer periphery, the read head 11R reads a part of the cylinder code of the adjacent track on a "+1" side (inner peripheral side) with respect to the cylinder code of the track in which the head is positioned.

Figure 11:
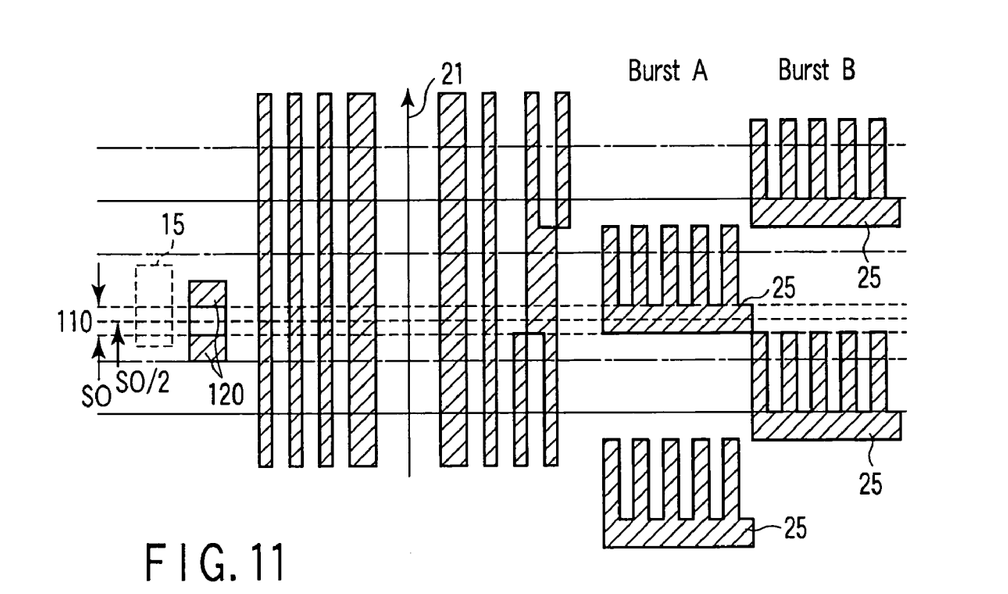

FIG. 11 shows a concrete example of an actually recorded state of the servo data by the HETS phenomenon. As shown in FIG. 11, a noise region (dead region) which does not contribute as the servo burst signal exists between the bursts A and B. When high track densification of the disk actually proceeds, the track width of the read head is reduced. Additionally, the head 15 contacts the track in a place centering on a dotted line 110 in order to satisfy a relation "burst A=burst B" in a position offset by SO/2 from a relation with the dead region. In this place, the regions 25 which do not contribute as the servo burst signals exist in the bursts A and B. Therefore, as shown in FIG. 11, a regional portion 120 which contributes to the head 15 as the servo burst signal is reduced. Accordingly, a quality of the signal contributing to the control for positioning the head degrades, and, as a result, a region in which the relation between a control amount (distance) and a control signal amount (voltage) has linearity is narrowed. That is, with a decrease of a dynamic range, a precision in positioning the head is lowered.

(Servo Writing Method)

Figure 15:
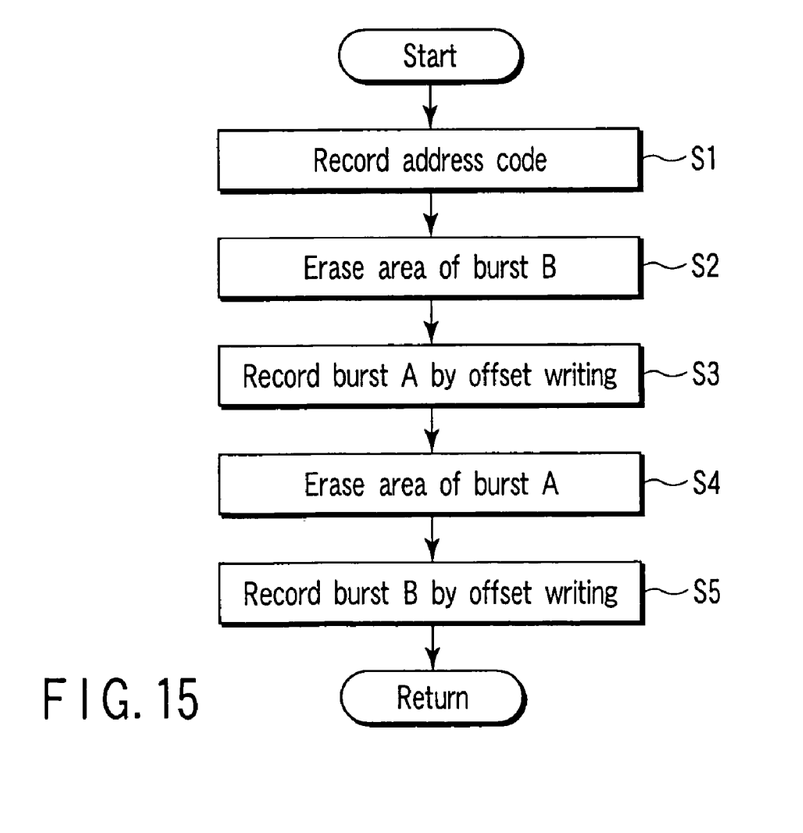
FIG. 15 is a flowchart showing a procedure of a servo writing operation according to the present embodiment.

Next, a servo writing method of the present embodiment using an STW 13 will be described mainly with reference to FIGS. 1, 2A to 2D, and a flowchart of FIG. 15.

Basically in the servo writing method in which servo data is recorded on a disk 10, a write head 20 is positioned, for example, at a pitch which is ⅓, ½, or ¼ of a track pitch by control of the STW 13, while the servo data is superimposed upon a part of the adjacent servo data. The servo data is connected to one another in this manner, and recorded without any gap.

Figure 1:
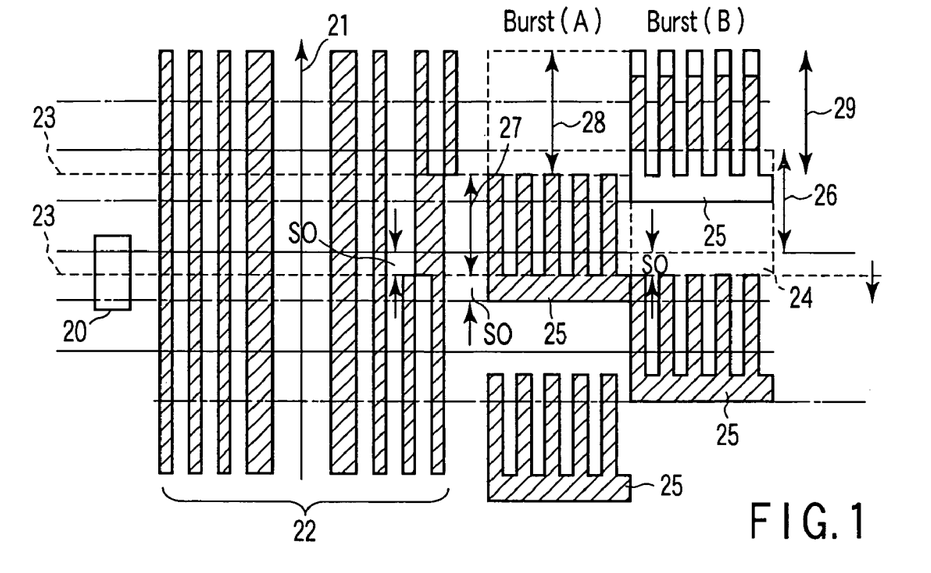
FIG. 1 is an explanatory view of a servo writing method according to an embodiment of the present invention.

FIG. 1 shows a case where the servo data is written, for example, in a direction (arrow 21) from the inner peripheral side to the outer periphery of the disk 10. FIGS. 2A to 2D show timing gate signals SG30 to SG33 necessary for a servo writing operation in the STW 13. FIG. 15 is a flowchart showing a procedure of the servo writing of the STW 13.

Figure 2A:
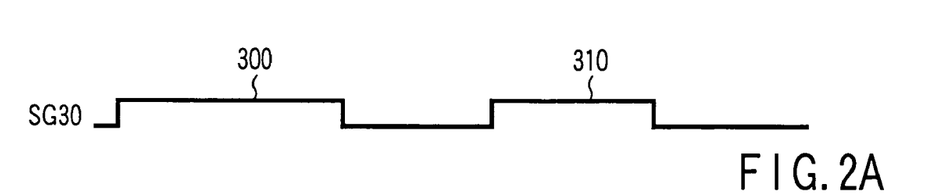
FIGS. 2A to 2D are timing charts showing the servo writing method according to the present embodiment.

The STW 13 records address codes (cylinder codes and sector codes) 22 in a write timing 300 of SG30 (step S1). A recording area (26) of the burst B is erased in a write timing 310 of SG30 (step S2). In this case, by characteristics of the SPT which is the write head 20 and the disk 10 for the perpendicular magnetic recording, the erased region shifts from the area 26 in an arrow track direction (direction reverse to the writing direction 21) by an amount SO (area 24). This shift amount SO indicates a value determined based on the above-described HETS phenomenon, and an amount corresponding to about 10% of the track pitch is experimentally confirmed (concretely, about 20 nm). In this case, the same degree of a shift as the shift amount SO is also generated in the portion of the address code 22.

Figure 2B:
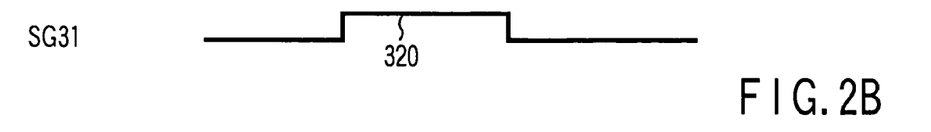

Next, the STW 13 records a servo burst signal (27) of the burst A in a write timing 320 of SG31 (step S3). In the timing 320, the STW 13 executes an offset writing operation to position the write head 20 in a position obtained by subtracting an offset amount (corresponding to the shift amount SO) from an original feeding pitch and to record the servo burst signal (27) of the burst A. By this operation, the region 25 which does not contribute to the servo burst signal by the HETS phenomenon is recorded in a position offset by the offset amount SO. By these two operations, the STW 13 records the signal 27 of the burst A, and records the erased region 26 (including 24) in a timing just after the prior timing.

Figure 2C:
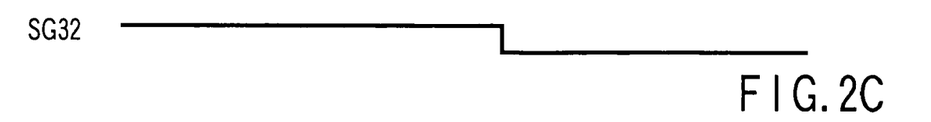
Figure 2D:
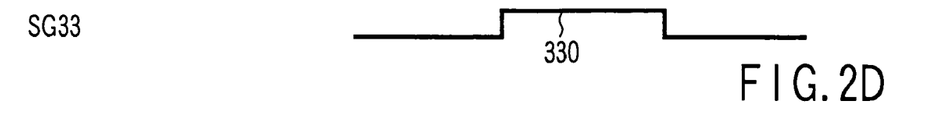

Next, the STW 13 records an erased region 28 of the burst A in the timing of SG32 (step S4). By this erasing, an unnecessary signal region on the outer peripheral side of the servo burst signal 27 of the burst A is erased. Furthermore, the STW 13 records a servo burst signal 29 of the burst B in a write timing 330 of SG33 (step S5). Also in this case, the STW 13 executes an offset writing operation to position the write head 20 in a position obtained by subtracting the offset amount SO from the original feeding pitch in the timing 320 and to record the servo burst signal 29 of the burst B.

The STW 13 repeats the above-described operation for the predetermined number of tracks to thereby record the regions 25 which do not contribute to the servo burst signals in the bursts A and B in positions offset by the offset amount SO. Therefore, positions corresponding to track center lines in which the bursts A and B reproduced by the read head have a relation "A=B" are shown by dotted lines 23 in FIG. 1.

As described above, in the present embodiment, in the servo writing method, when the servo burst signals (bursts A and B) are recorded, an offset writing operation is executed to offset the position of the write head 20 in a direction reverse to the writing direction 21 by the offset amount SO and to write the signals. Therefore, as described above, the recording shift (shift amount SO) generated by the HETS phenomenon can be compensated for at the time of the servo writing.

Therefore, in the disk drive (see FIG. 4) incorporating the disk 10 on which the servo data is recorded by the servo writing method of the present embodiment, the head 15 can be brought into contact with the center line (23 of FIG. 1) on the track based on the servo data. Accordingly, as a result, the head positioning precision can be improved.

Furthermore, since losses of the dynamic range in the head positioning control or dead zones of the servo burst signals are eliminated, the head positioning control is not adversely influenced. Additionally, since all the track widths of the read head can contribute to the reproduction of the servo burst signals, the tracks are effectively highly densified.

Furthermore, since the head 15 can be correctly positioned based on the servo burst signals, the address code 22 can be normally reproduced, the reproduction error of the cylinder code can be inhibited from being generated.

(HETS and Offset Amount)

Figure 12:
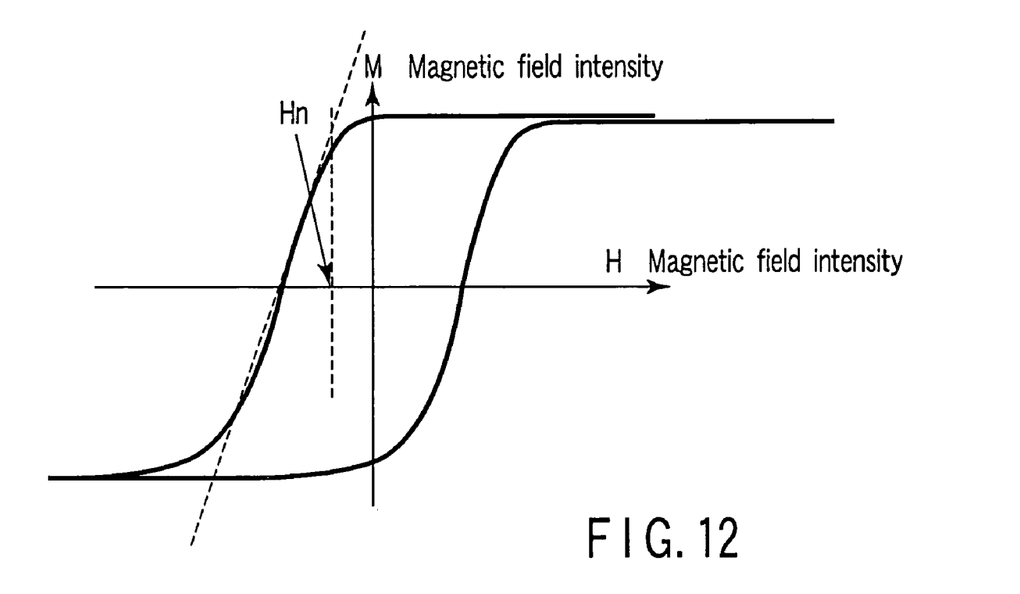
FIG. 12 is a diagram showing Hn characteristics of the disk of the perpendicular magnetic recording system according to the present embodiment.
Figure 13:
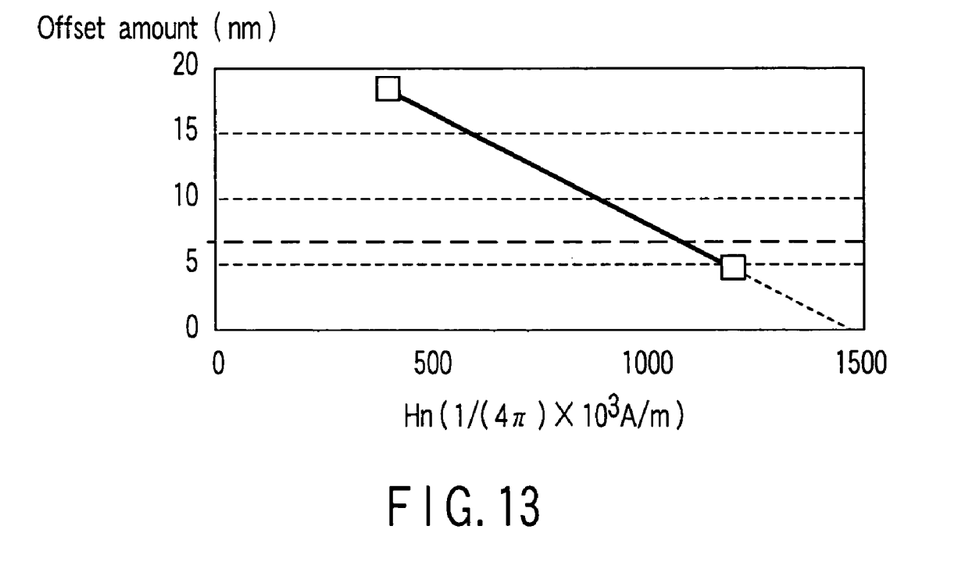
FIGS. 13 and 14 are diagrams showing characteristics of an offset amount with respect to Hn according to the present embodiment.
Figure 14:
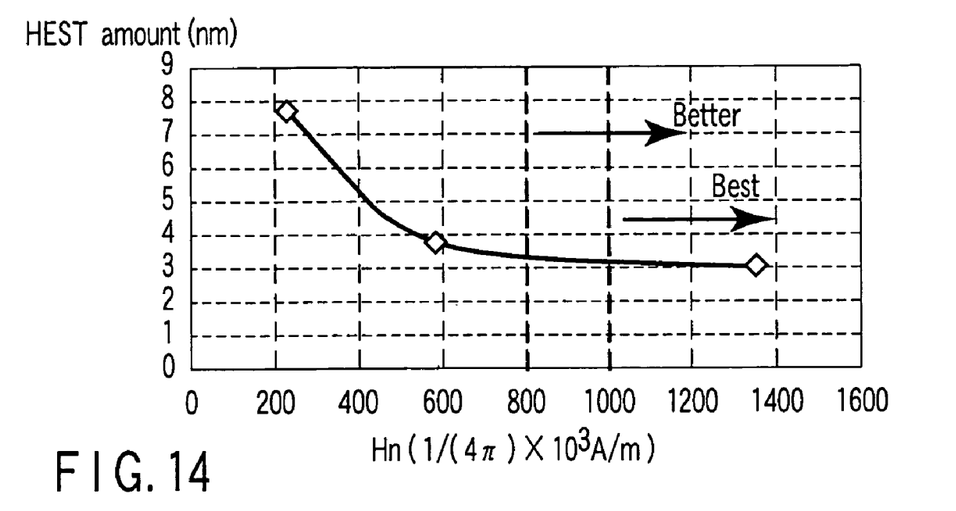

FIGS. 12, 13, and 14 are characteristic diagrams concerning HETS and offset amounts at the time of servo writing according to the present embodiment.

It has been confirmed that the HETS phenomenon is caused by recording conditions of a write head using an SPT, magnetostatic characteristics of a disk of a perpendicular magnetic recording system, and an inverse magnetic domain generated magnetic field Hn. Hn denotes a magnetic field intensity in an M-H characteristic loop shown in FIG. 12.

FIG. 14 shows an example of a measurement result of an HETS amount with respect to Hn. From measurement results shown in FIG. 14, it can be confirmed that when the disk has an Hn of 800 or 1000 or more, the shift amount is inhibited from being generated by the HETS phenomenon.

FIG. 13 shows an example of the measurement result concerning setting of an offset amount in a case where an offset writing operation is executed at the time of a servo writing operation by the STW. That is, the offset amount which is the measurement result corresponds to a set value, for example, in a case where the reproduction error of the cylinder code falls within an allowable range.

In the servo writing by the STW, it is not practical to adjust the position of the head with an offset amount which has been set to a large value. Then, when the measurement result of the HETS amount with respect to Hn shown in FIG. 14 is considered, and when Hn of the disk is 800 or more, the HETS amount is suppressed, and therefore the offset amount does not have to be set to such the large value. The vicinity of a dotted line shown in FIG. 13 is a preferable concrete example of an actual offset amount.

As described above, in the servo writing method of the present embodiment, it is possible to effectively inhibit the head positioning precision from being degraded by the HETS in a disk drive to which the perpendicular magnetic recording system is applied and which has a high track density exceeding, for example, 100 kTPI.

It is to be noted that in the present embodiment, only the bursts A and B have been described as the servo burst signals, but naturally the present invention may be applied to the servo burst signals of a usual four-phase bursts A to D system or a six-phase bursts A to F system. In the servo writing by the STW of the present embodiment, the direction from the inner periphery to the outer periphery has been described as the writing direction 21, but naturally the present invention may be applied to the servo writing in a reverse direction (from the outer periphery to the inner periphery). Additionally, in this case, the offset direction is the direction of the outer periphery.

As described above, according to the servo writing method of the present embodiment, since the shift of the servo data in a radial direction can be compensated based on the HETS phenomenon, as a result, high-precision servo data can be recorded on the disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of writing servo data on a disk medium using a write head in perpendicular magnetic recording system, the method comprising;
   moving the write head to a designated position of the disk medium in a radial direction; and
   executing a writing operation including an offset process set based on a hard easy transition shift (HETS) phenomenon, when the servo data is recorded in the designated position by the use of the write head,
   wherein the offset process comprises: offsetting the position of the write head in a direction reverse to the radial direction in accordance with a servo writing direction based on an offset value measured based on the HETS phenomenon to execute the servo writing.

2. A method of writing servo data on a disk medium using a write head in a perpendicular magnetic recording system, the method comprising:
   moving the write head to a designated position of the disk medium in a radial direction; and
   executing a writing operation including an offset process set based on a hard easy transition shift (HETS) phenomenon, when the servo data is recorded in the designated position by the use of the write head,
   wherein the offset process comprises: executing the servo writing in a direction reverse to the radial direction in accordance with a servo writing direction based on an offset value measured based on the HETS phenomenon; and offsetting a dead region of a servo burst signal included in the servo data.

3. A method of writing servo data on a disk medium using a write head in a perpendicular magnetic recording system, the method comprising:
   moving the write head to a designated position of the disk medium in a radial direction; and
   executing a writing operation including an offset process set based on a hard easy transition shift (HETS) phenomenon, when the servo data is recorded in the designated position by the use of the write head,
   wherein the servo data includes servo burst signals constituted of a first servo burst signal and a second servo burst signal which are different from each other in phase, and an offset writing operation is executed to offset the first and second servo burst signals in a direction reverse to the radial direction in accordance with a servo writing direction in different timings based on an offset value measured based on the HETS phenomenon in the direction reverse to the radial direction in accordance with the servo writing direction and to thereby record the servo burst signals.

4. A method of writing servo data on a disk medium using a write head in a perpendicular magnetic recording system, the method comprising:
   moving the write head to a designated position of the disk medium in a radial direction; and
   executing a writing operation including an offset process set based on a hard easy transition shift (HETS) phenomenon, when the servo data is recorded in the designated position by the use of the write head,
   wherein the offset process comprises: offsetting the position of the write head in a direction reverse to the radial direction in accordance with a servo writing direction by the use of an offset value set based on a relation between invert magnetic domain generated magnetic field characteristics (Hn) of the disk medium and a shift amount resulting from the HETS phenomenon to execute the servo writing.

5. A method of writing servo data on a disk medium using a write head in a perpendicular magnetic recording system, the method comprising:
   moving the write head to a designated position of the disk medium in a radial direction; and
   executing a writing operation including an offset process set based on a hard easy transition shift (HETS) phenomenon, when the servo data is recorded in the designated position by the use of the write head,
   wherein the offset process comprises: offsetting the position of the write head in a direction reverse to the radial direction in accordance with a servo writing direction by the use of an offset value set based on Hn in a case where the disk medium having an Hn value of 800 $(1/(4\pi) \times 10^3$ A/m) or more is used based on a relation between invert magnetic domain generated magnetic field characteristics (Hn) of the disk medium and a shift amount resulting from the HETS phenomenon to execute the servo writing.

6. A method of writing servo data on a disk medium using a write head in a perpendicular magnetic recording system, the method comprising:
   moving the write head to a designated position of the disk medium in a radial direction; and
   executing a writing operation including an offset process set based on a hard easy transition shift (HETS) phenomenon, when the servo data is recorded in the designated position by the use of the write head.
   wherein the offset process comprises: offsetting the position of the write head in a direction reverse to the radial direction in accordance with a servo writing direction by the use of an offset value set based on Hn in a case where the disk medium having an Hn value of 1000 $(1/(4\pi) \times 10^3$ A/m) or more is used based on a relation between invert magnetic domain generated magnetic field characteristics (Hn) of the disk medium and a shift amount resulting from the HETS phenomenon to execute the servo writing.

* * * * *